Patented May 22, 1923.

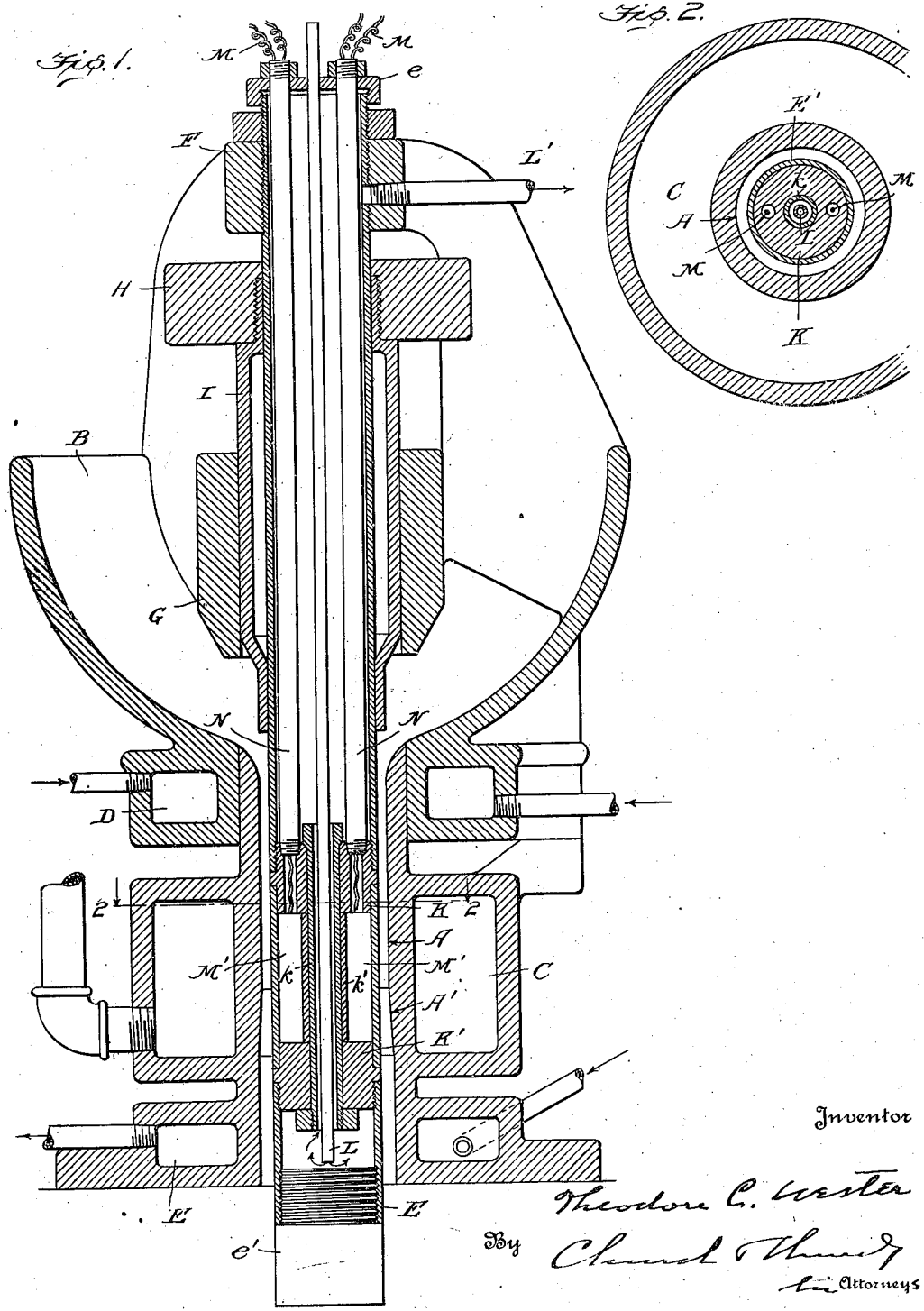

1,455,946

UNITED STATES PATENT OFFICE.

THEODORE C. WESTER, OF WILMINGTON, DELAWARE.

APPARATUS FOR FORMING ARTICLES OF CORK.

Application filed June 26, 1922. Serial No. 570,904.

*To all whom it may concern:*

Be it known that I, THEODORE C. WESTER, a citizen of the United States, residing at Wilmington, in the county of New Castle and State of Delaware, have invented certain new and useful Improvements in Apparatus for Forming Articles of Cork; and I do hereby declare the following to be a full, clear, and exact description of the same, reference being had to the accompanying drawings, forming part of this specification.

This invention relates to improvements in apparatus for the production of articles made of comminuted cork, the particles of which are bound together by a binding agent which is coagulated or vulcanized and set by heat and pressure, the desired degree of pressure being maintained during cooling to prevent deformation of the product. More specifically the invention relates to and has for its objects to improve the class of apparatus wherewith the articles are formed by forcing the prepared comminuted cork into and through a die or tube in which zones of low and elevated temperature are maintained. Apparatus of this type as heretofore constructed is not well adapted for making tubular or hollow articles where uniformity of internal and external structure is desired or necessary. The difficulty which is overcome by the present invention was due to lack of means for the regulation of temperatures in the zones of treatment, whereby the internal as well as the external portions of the article would be simultaneously and similarly acted on to form the article and coagulate and set the binder.

In accordance, therefore, with the present invention, the zones of temperature treatment are created, not only in the external confining tube or die, but also in the internal forming member or mandrel, whereby uniformity of internal and external treatment is secured.

Referring to the accompanying drawings,—

Figure 1 is a section in a vertical plane through one unit of an apparatus embodying the present invention.

Fig. 2 is a transverse section at a point near the entrance end of the die.

The die or mold through which the comminuted cork and binder are forced is preferably arranged vertically to facilitate the uniform feeding of the material to its entrance end, and as shown it is of circular cross section to form a cylindrical tubular product, the confining wall A for a distance below its flaring entrance end being made substantially cylindrical or slightly contracting and then for a short distance, as at A', gradually expanding or enlarging, while the exit end is of substantially uniform diameter.

The entrance or upper end of the die or mold opens into a hopper or reservoir B for the cork and binder which latter may be supplied by hand or any suitable automatic feeder, an automatic feeder being desirable where a battery or series of dies are arranged in proximity and adapted to be operated as a single machine or apparatus.

Provision is made for creating heating and cooling zones in the die or mold conveniently consisting of fluid jackets or chambers surrounding the die. Thus the larger central chamber C is adapted for the reception or circulation of a heating medium such as hot oil, while the top and bottom chambers D and E are adapted for the circulation of a cooling medium, such as water.

Extending into and through the die is a mandrel or internal former E with its external wall spaced from the die to give the proper shape and thickness to the wall of the article being formed. The mandrel is adjustably supported at its upper end in a yoke or frame F which may, if desired, extend up from the hopper and in addition is preferably braced against lateral deflection as by a surrounding bearing G spaced from the frame F a sufficient distance to provide for the operation of a reciprocatory crosshead H. The cross-head H carries a downwardly extending tubular plunger I which surrounds the mandrel and works in the bearing G. The plunger I reciprocates into and out of the upper end of the die and forces successive charges or increments of the prepared cork and binder into the die wherein the article is given form and the binder coagulated and set during the passage under pressure through the heating and cooling zones.

The practical success of the process of manufacture depends upon the proper application of heat and pressure and as incidental thereto the proper control of the expansion which tends to take place before the article is restored to normal temperature. Owing to the non-heat conducting character of the material great difficulty has been encountered in producing properly cured hollow or tubular articles with proper surface finish inside as well as outside. These difficulties have been overcome in the present apparatus by providing the mandrel with heating and cooling means for creating heating and cooling zones corresponding or substantially corresponding to the zones in the die or mold. Thus both the inner and outer faces of the article may be similarly treated and the treatment may be extended into and through the body of the article, without application of excessive or injurious heat to either face.

In the preferred construction a circulating liquid medium is employed to effect cooling and to prevent transfer of heat to the material before it is properly formed and compressed, while a heating means is preferably employed which will convert energy into heat at the point of utilization, such as an electric heater, whereby loss due to heat transfer in the system at points remote from the points of utilization is largely avoided.

The mandrel E is generally tubular and of cylindrical section, tapered slightly at the lower end and having closures $e$, $e'$ at the top and bottom. Intermediate partitions K, K' define the areas of the heating and cooling zones and such partitions may, if desired, be made of poor heat conducting material. Extending through the partitions and connecting the areas or chambers above and below the same is a duct or pipe $k$ surrounded by an insulating sleeve $k'$ and extending down from the upper end of the mandrel into the chamber below the partition K' is a cooling medium supply pipe L to which cold water, for example, may be supplied from any suitable source, and under proper regulation to cool the areas or chambers aforesaid to the proper degree. The cooling medium escapes through an outlet or overflow pipe L'.

Insulated electric conductors M extend down through the mandrel into the space between the partitions and supply current to the heating unit or units located in said space and indicated at M'.

For convenience of manufacture the intermediate part of the mandrel, including the heating unit and partitions, may be assembled as a unit, the parts being held together by the pipe $k$ and the other portions of the mandrel united thereto by screw-thread connections with the partitions, as shown. So, too, to protect the electric conductors more perfectly, they may pass in through conduits N threaded into the partition K and extending out through the upper closure of the mandrel.

In operation the comminuted cork and binder material is forced down around the mandrel and compressed or given form in the upper cool zone and gradually moves down into the heating zone under pressure which increases somewhat due to the heat and cumulative pressure. At the lower portion of the heating zone the cork is allowed to expand slightly while still held under restraint during its passage through the lower cooling zone, the result being that both the inner and outer faces are properly treated and the confined air or gases are cooled to a point where no distortion is caused when the article emerges from the die or former.

The tubular article produced may be sliced transversely to form gasket, rings, sleeves, etc., adapted for general utility.

What is claimed is:

1. In apparatus for forming tubular bodies of comminuted cork and binder, the combination with a tubular die and means for forcing cork into and through the same, of a mandrel mounted axially within said die, means for creating cooling and heating zones in the confining walls of the die, and means for creating cooling and heating zones in the wall of the mandrel in regions substantially opposite the cooling and heating zones of the die.

2. In apparatus for forming tubular bodies of comminuted cork and binder, the combination with a tubular die and a tubular plunger working in said die for forcing the cork through the same, of a mandrel within the die and plunger, and means for heating the mandrel at a point intermediate the ends of the die.

3. In apparatus for forming tubular bodies of comminuted cork and binder, the combination with a tubular die and a tubular plunger working in said die for forcing the cork through the same, of a mandrel within the die and plunger, means for heating the mandrel at a point intermediate the ends of the die, and means for cooling the mandrel in proximity to the entrance and exit ends of the die.

4. In apparatus for forming tubular bodies of comminuted cork and binder, the combination with a tubular die and a tubular plunger working in said die for forcing the cork through the same, of a mandrel extending through the plunger into the die, means for cooling both the die and mandrel in proximity to the entrance and exit ends of the die, and means for heating both the die and the mandrel intermediate the ends of the die.

5. In apparatus for forming tubular bodies of comminuted cork and binder, the combination with a tubular die and a tubular plunger for forcing the cork through the die, of a mandrel mounted in fixed position within the plunger and die, said mandrel embodying cooling chambers in proximity to the ends of the die with ducts leading thereto from one end of the mandrel for the supply and discharge of cooling medium, and an intermediate heater, heat insulated from said ducts with leads for said heater extending through the end of the mandrel through which cooling medium is supplied.

6. In a tubular cork forming apparatus, an upright tubular die, a hopper at the upper end of the die, a mandrel mounted concentrically within the die, a tubular plunger surrounding the mandrel and movable into and out of the upper end of the die, and means for creating cooling zones in the mandrel and die near the entrance and exit ends of the latter, and means for creating a heating zone at a point intermediate said ends.

THEODORE C. WESTER.